US010019252B1

(12) United States Patent
Cui et al.

(10) Patent No.: US 10,019,252 B1
(45) Date of Patent: Jul. 10, 2018

(54) VIRTUALIZING INSTALLERS

(71) Applicant: Nutanix, Inc., San Jose, CA (US)

(72) Inventors: Miao Cui, Sunnyvale, CA (US); Jaspal Singh Dhillon, Karnataka (IN); Jan Ralf Alexander Olderdissen, Herrenberg (DE)

(73) Assignee: Nutanix, Inc., San Jose, CA (US)

( * ) Notice: Subject to any disclaimer, the term of this patent is extended or adjusted under 35 U.S.C. 154(b) by 31 days.

(21) Appl. No.: 15/093,658

(22) Filed: Apr. 7, 2016

(51) Int. Cl.
*G06F 9/44* (2018.01)
*G06F 8/654* (2018.01)
*G06F 9/445* (2018.01)
*G06F 9/4401* (2018.01)
*G06F 9/455* (2018.01)
*G06F 8/61* (2018.01)

(52) U.S. Cl.
CPC ............... *G06F 8/654* (2018.02); *G06F 8/61* (2013.01); *G06F 8/665* (2013.01); *G06F 9/4406* (2013.01); *G06F 9/45558* (2013.01); *G06F 2009/45575* (2013.01); *G06F 2009/45579* (2013.01); *G06F 2009/45583* (2013.01)

(58) Field of Classification Search
CPC ..................................... G06F 8/68; G06F 8/61
USPC ......................................................... 717/169
See application file for complete search history.

(56) References Cited

U.S. PATENT DOCUMENTS

| 2011/0167473 | A1* | 7/2011 | Evans | G06F 9/45541 |
| | | | | 726/1 |
| 2011/0246626 | A1* | 10/2011 | Peterson | G06F 9/4416 |
| | | | | 709/220 |
| 2012/0151201 | A1* | 6/2012 | Clerc | G06F 9/441 |
| | | | | 713/2 |
| 2012/0151202 | A1* | 6/2012 | Clerc | G06F 12/02 |
| | | | | 713/2 |
| 2013/0219161 | A1* | 8/2013 | Fontignie | G06F 9/4401 |
| | | | | 713/2 |
| 2015/0198108 | A1* | 7/2015 | Mullen | F02D 41/1487 |
| | | | | 701/104 |
| 2016/0191332 | A1* | 6/2016 | Markley | H04L 67/34 |
| | | | | 709/223 |
| 2016/0232025 | A1* | 8/2016 | Speak | G06F 9/45533 |
| 2017/0054603 | A1* | 2/2017 | Kulkarni | H04L 41/0893 |

OTHER PUBLICATIONS

Red Hat Customer Portal, "32.4. Kickstart Options", Dec. 1, 2015 url: https://access.redhat.com/documentation/en-US/Red_Hat_Enterprise_Linux/6/html/Installation_Guide/s1-kickstart2-options.html.

* cited by examiner

*Primary Examiner* — John Chavis
(74) *Attorney, Agent, or Firm* — Vista IP Law Group, LLP

(57) ABSTRACT

Systems and methods for deploying and managing virtual machine clusters. A method commences upon launching, on a subject processor instance that is running a first operating system, an installation hypervisor that forms a RAM disk comprising an installation boot image and respective one or more scripts. A bootable portion of the RAM disk is exposed to a virtual machine so as to serve as a virtual boot device that comprises the installation boot image and its one or more scripts. Next, a physical boot device is exposed to the virtual machine so as to initiate a boot operation that causes the virtual machine to boot. A subsequent boot operation is initiated to cause transfer of instruction execution to a low-level I/O subsystem entry point such that the target boot image is booted.

20 Claims, 16 Drawing Sheets

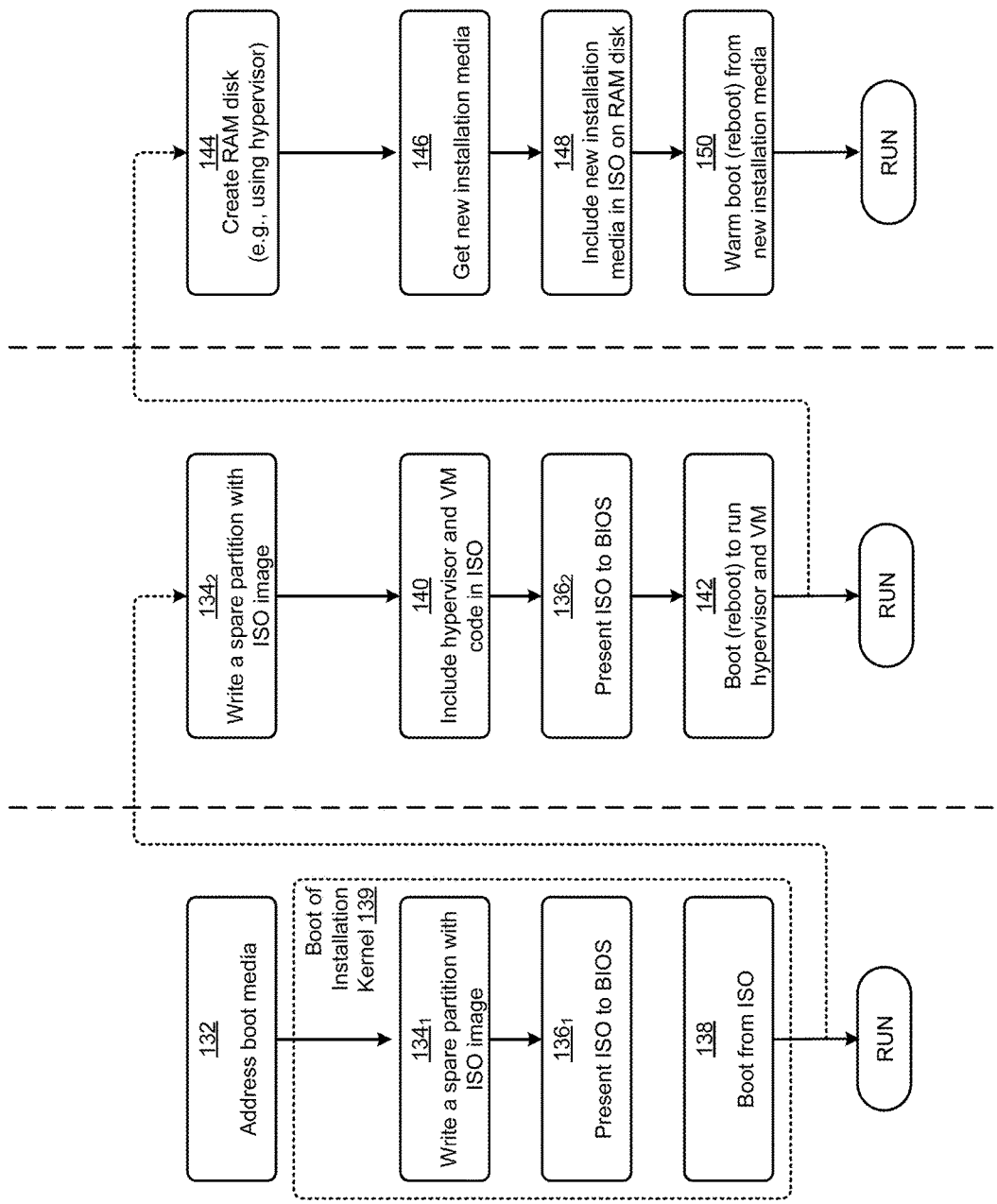

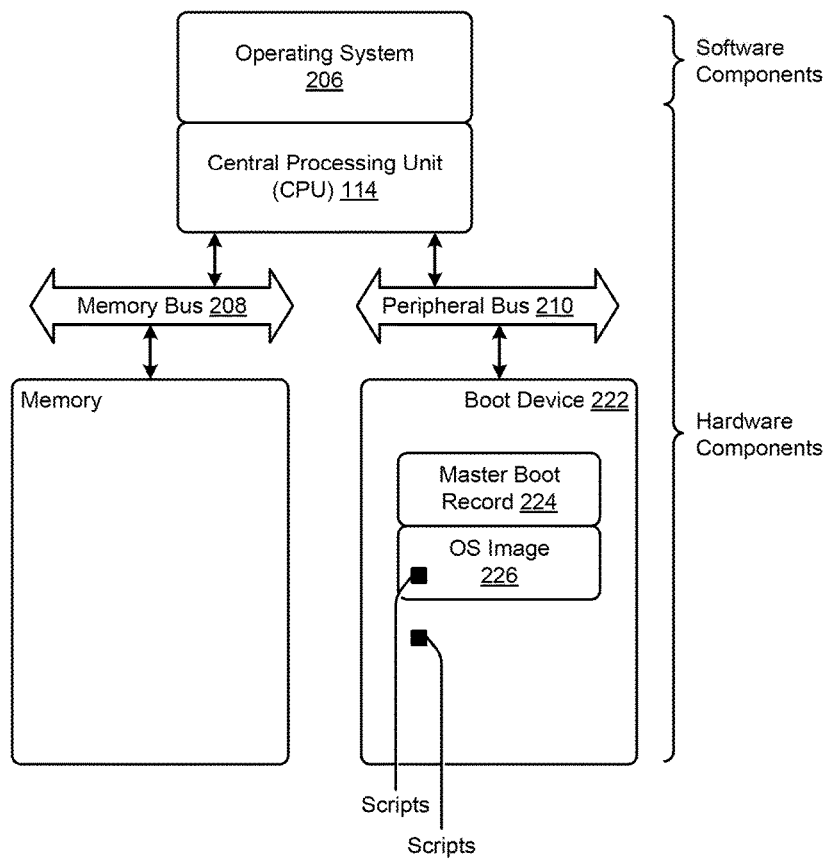
FIG. 2A1

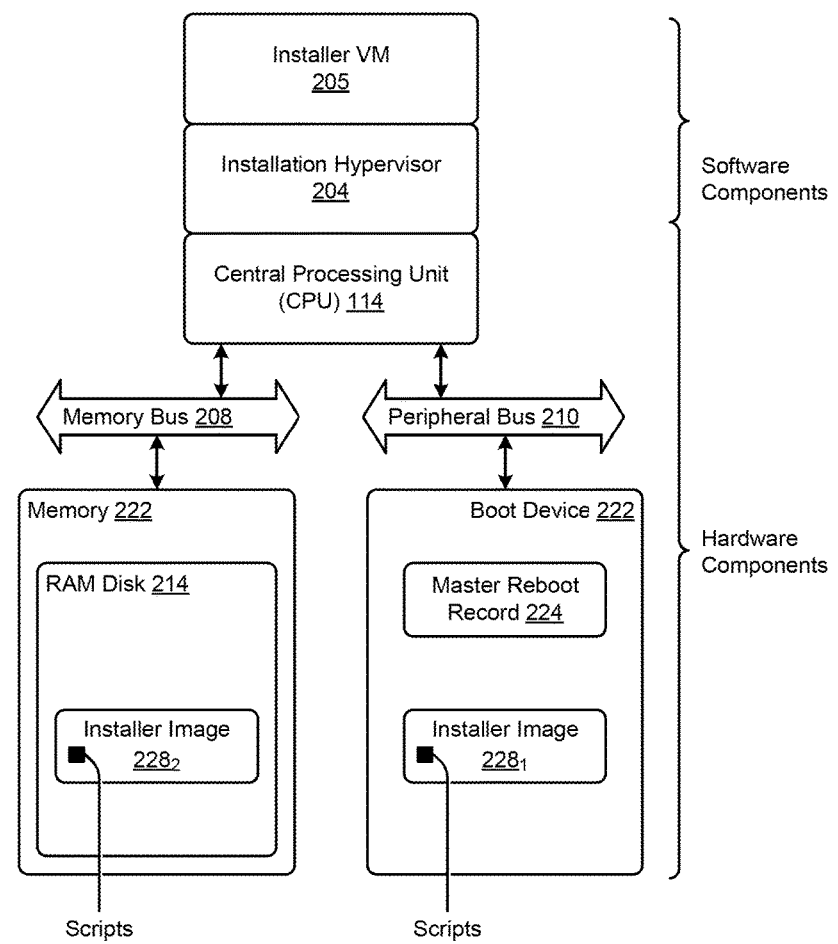
FIG. 2A2

VIRTUALIZING INSTALLERS

FIELD

This disclosure relates to deploying and managing multi-processor computing platforms, and more particularly to techniques for virtual machine installers to boot from node-local volatile RAM disk boot devices.

BACKGROUND

Individual nodes in a multi-processor computing platform need to be updated periodically, at least due to periodic updates that pertain to an underlying operating system. This can be handled by redeployment of new configurations (e.g., instances) of updated images. A hypervisor or other helper software can be instructed to refresh a configuration (e.g., instance) of a node. In a cluster environment (e.g., having many processors that can be directed by a cluster manager), a cluster manager can instruct all hypervisors running in a cluster to update respective nodes. Accordingly, even a large installation (e.g., many processors, many clusters, etc.) can be updated programmatically (e.g., through installation instructions and/or installation scripts). In some cases hypervisors themselves and any operating system code running under the hypervisor can sometimes also need updates to the respective software base. Legacy boot-strapping of a processor—installing an operating system code base to be executed by the processor—needs at least some support from the hardware and/or BIOS in order to read the operating code from some media (e.g., a CDROM, a DVD, a formatted flash drive, etc.).

Unfortunately, it quickly becomes impractical to use such legacy techniques, at least inasmuch as legacy techniques rely on minimally-functional, hardware-specific busses (e.g., an intelligent platform management interface (IPMI)), and hardware-specific components (e.g., baseboard management controllers (BMCs)) in combination with low-level protocols (e.g., BIOS protocol to boot from an ISO image). Consider an installation that has many processors in a cluster running a first operating system that is to be reconfigured to run a second operating system, plus any hypervisors and/or virtual machines running on the same cluster hardware. Legacy techniques rely heavily on vendor-specific tools when installing operating system images (plus any needed hypervisors and/or virtual machines running on the same cluster hardware), and reliance on such vendor-specific tools is fraught with both hardware- and software-oriented problems. As examples, (1) using IPMI virtual media requires additional cabling and switch capacity that may or may not be available at the location of the cluster to be upgraded; (2) BMCs are notoriously unreliable, resulting in installation failures traced to BMC hang events; and (3) configuring IPMI networking in addition to any needed hypervisor and virtual machine networking is often non-trivial and places a severe burden on the installation manager. What is needed are ways to eliminate or reduce reliance on any external imaging devices (e.g., for hosting an ISO image) while facilitating easy configuration (e.g., that can be performed by end users or system administrators).

Legacy techniques rely heavily on proprietary technologies such as preboot execution environments (e.g., PXE) and/or Linux-specific tools (e.g., DD), and techniques such as to write a spare partition on the boot media, mark it for boot and boot into it are also riddled with vendor-dependencies as well as inter-vendor incompatibilities.

What is needed is a technique or techniques to improve over legacy approaches.

BRIEF DESCRIPTION OF THE DRAWINGS

The drawings described below are for illustration purposes only. The drawings are not intended to limit the scope of the present disclosure.

FIG. 1C, FIG. 1D, FIG. 1E and FIG. 1F exemplify several multi-boot installation flows.

FIG. 2A1 depicts an initial boot device configuration.

FIG. 2A2 depicts an installation hypervisor boot device configuration as used in systems that support virtual machine installers to boot from a volatile RAM disk boot device.

DETAILED DESCRIPTION

Figure 1A:
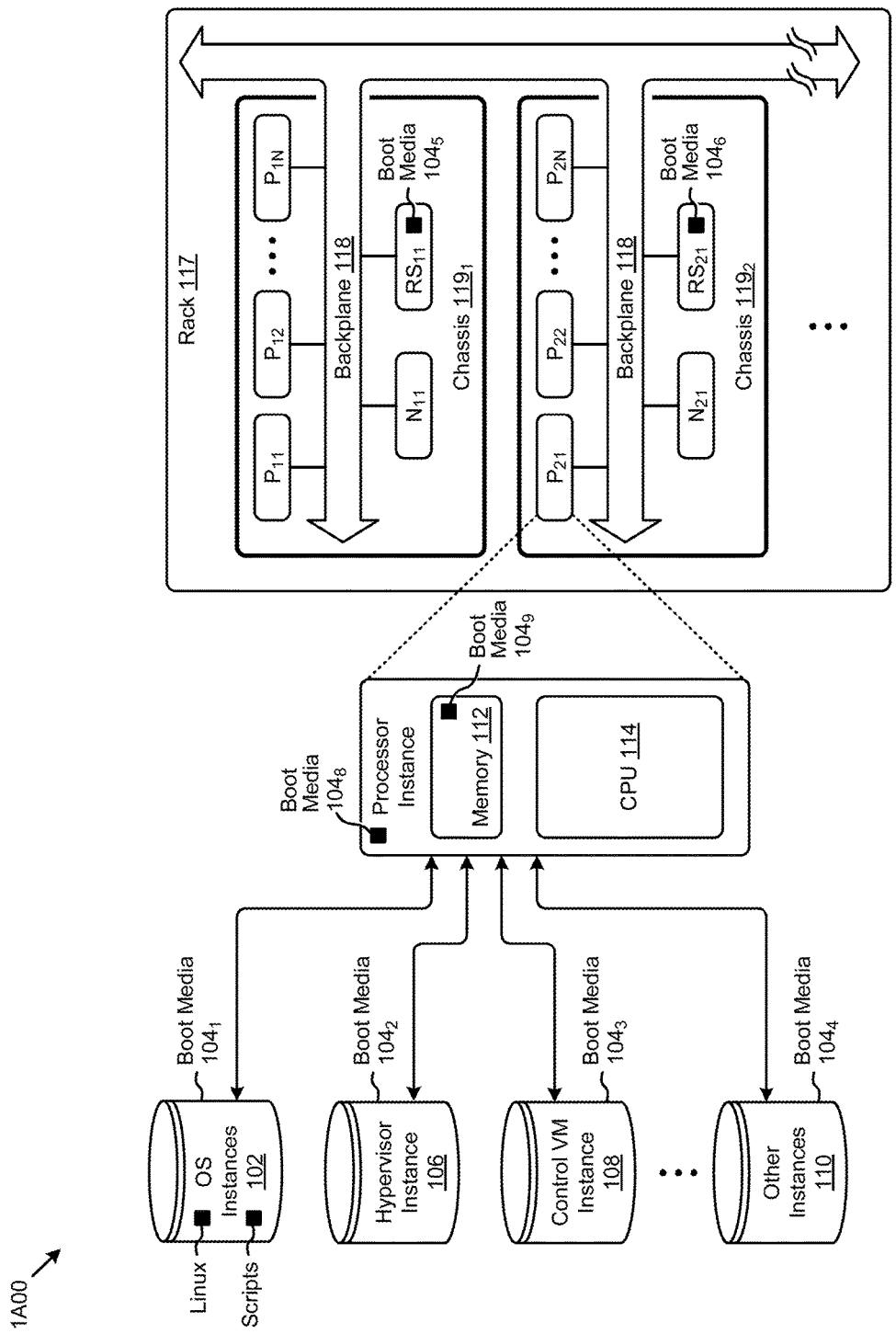
FIG. 1A depicts an environment that highlights the need for virtual machine installers.

Some embodiments of the present disclosure address the problems that arise when traditional boot loaders are not appropriate for installing operating systems in a cluster of computing nodes running virtual machines, and some embodiments are directed to approaches for using VM-based installers that boot from ephemeral node-local RAM disk boot devices. More particularly, disclosed herein and in the accompanying figures are exemplary environments, systems, methods, and computer program products for virtual machine installers to boot from node-local volatile RAM disk boot devices.

Overview

Disclosed herein are techniques for running installers (e.g., installers of operating systems or installers of other low-level code) in a virtual machine (VM). Many barriers that are present when using legacy installers are overcome. For example, when running installers such as are herein described (e.g., from within a hypervisor or from within a VM), the boot device can be any storage device, including a virtualized storage device such as a RAM disk. An ISO image can be formatted with to-be-imaged code and loaded onto a virtual boot device, the existence and characteristics of which are passed to the VM using a PCI pass-through facility, or as a raw device.

A Hypervisor Prepares the Boot Device

In a set of steps taken by a hypervisor, a VM can be configured with a first boot device (e.g., a virtual boot device), and cause the VM's processor to reboot (e.g., to invoke the VM's BIOS). The installation then proceeds normally in accordance with BIOS instructions, and a second image, possibly on a second boot device, is prepared for boot. At reboot, the node boots into the prepared second image on the second boot device.

The second installation media can be presented to the installer VM as a standard ISO CD-ROM image on or at a wide variety of sources (e.g., in a file on a RAM disk, at a network source, etc.). In some cases the bootable (e.g., ISO) image can be used as a mechanism for dynamically patching a file such as is used in ISO patchers. The node does not need to be cold rebooted for the various phases of installation, thus reducing installation duration. As one of ordinary skill in the art can appreciate, installation duration can become non-negligible—especially when an installation traverses many reboot events and/or when there are many nodes to be installed. For example, in a cluster composed of elastic sky X (ESX) hypervisors, each processor node in the cluster installation can consume many reboots such as (1) a pre-install boot, (2) the requisite ESX installer reboot, (3) the actual ESX boot, (4) a control virtual machine installer reboot, and (5) an ESX first boot after control virtual machine configuration. Thus embodiments disclosed herein improve over legacy techniques.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 1A00 that highlights the need for virtual machine installers. The depiction of FIG. 1A is merely an example.

As shown, a cluster is composed of a cluster unit (e.g., rack 117) that is in turn composed of any number of sub-units (e.g., chassis $119_1$, chassis $119_2$). Any number of sub-units within the cluster communicate over one or more networks (e.g., backplane 118). Each sub-unit supports any number of processor instances (e.g., $P_{11}$, $P_{12}$, $P_{1N}$, $P_{21}$, $P_{22}$, $P_{2N}$) as well as a network interface (e.g., $N_{11}$, $N_{21}$), and remote storage interface (e.g., $RS_{11}$, $RS_{21}$), all of which are networked together over the backplane.

Also shown is a zoom-in of a processor instance that comprises a central processing unit (e.g., CPU 114) and corresponding memory 112. Any of the shown processor instances can access boot media from a variety of volatile or non-volatile storage devices. As shown, bootable media (e.g., boot media $104_1$, boot media $104_2$, boot media $104_3$, boot media $104_4$) can take the form of OS instances 102 and/or a hypervisor instance 106 and/or a control VM instance 108 and/or other instances 110. Strictly as examples, the OS instances can comprise a Linux operating system image and/or boot-up scripts. A hypervisor instance can comprise an ESX image.

Boot media of any configuration can be stored in an external device (e.g., media external to the rack) and/or can be stored in local storage (e.g., see boot media $104_5$ and boot media $104_6$) and/or can be stored in area accessible to a respective processor (e.g., see boot media $104_8$), possibly including a RAM disk that is formed from memory allocated to that processor (e.g., see boot media $104_9$).

Figure 1B:
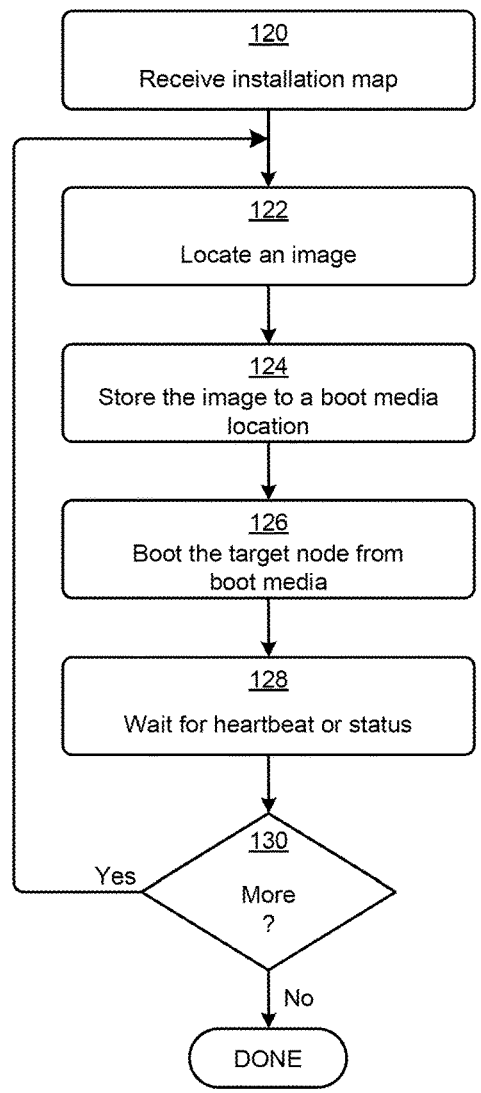
FIG. 1B is a flowchart showing a cluster-wide OS installation technique.

FIG. 1B is a flowchart showing a cluster-wide OS installation technique 1B00.

The flow of FIG. 1B is merely one example. Other flows are possible. As shown, the flow commences upon receiving an installation map (see step 120). An image (e.g., bootable media) to be used in the cluster-wide OS installation is located (see step 122) and the located image is stored to a boot media location such that a node or processor can access the image and boot using the given image (see step 124). The node is booted (e.g., see step 126) by forcing the node's program counter to begin processing instructions from a predetermined memory address location (e.g. virtual address zero, or the address of the node's BIOS entry point). The flow might be able to detect some indication that the node has initiated the boot (e.g., begun processing instructions of the BIOS), or have some other way to determine that the node has been started (see step 128). In some cases, a heartbeat is detected, and the flow determines (e.g., by consulting the installation map) if there are more nodes to be booted (see decision 130). When there are no more nodes to boot, or when all nodes have booted up (or at least have been addressed by the flow), then the flow ends.

FIG. 1C, FIG. 1D, FIG. 1E, and FIG. 1F exemplify several multi-boot installation flows. In some cases, and as discussed herein, a series of flows can be cascaded so as to boot a processor several times, each time with some variation in the boot device presented to the BIOS and/or with some variation as to the contents of the boot device.

As shown, the flow commences when a processor addresses boot media as determined by a predetermination or by the BIOS (see step 132). At some point, the processor will begin executing instructions as were found on the boot media, and such instructions can prepare another partition with different boot media (see step $136_1$), which partition can be formatted so as to be natively readable by a boot loader. Such a partition includes a set of content sufficient to boot an installation hypervisor. Such a partition might also include markers such as a master boot record or other markers or associations such that the BIOS will consider that partition as a boot partition, and the processor can be booted up (see step 138) from the newly-formed partition (see step $134_1$). The boot code (e.g., an installation kernel 139) as provided in the bootable ISO image (see step 138) can in turn prepare yet another bootable partition (see step $134_2$). In the example shown, the installation kernel prepares yet another bootable partition. The yet another bootable partition can include hypervisor code and code for one or more virtual machines (see step 140), which in turn can be presented to the BIOS (see step $136_2$) such that the processor can again be booted, from the yet another bootable partition to bring-up the hypervisor virtual machines (see step 142).

In some cases, a VM running atop a hypervisor can allocate (e.g., using a hypervisor) a RAM disk area from memory (see step 144). The RAM disk can serve many purposes, one of which includes obtaining additional installation media (see step 146). As is known in the art, a RAM disk can serve as a boot device (e.g., when following a "warm boot operation" or "warm boot protocol"). Such a case is depicted in this FIG. 1E, specifically, after including the new installation media onto the RAM disk, and formatting the RAM disk as an ISO image (see step 148), the VM can be warm-booted (see step 150), and launched to run the program or programs included in the new installation media.

Some of the forgoing steps can be modified and/or additional steps can be undertaken in different flows. Some of such different flows and some step modifications are shown and discussed as pertains to the following figures.

Figure 1F:
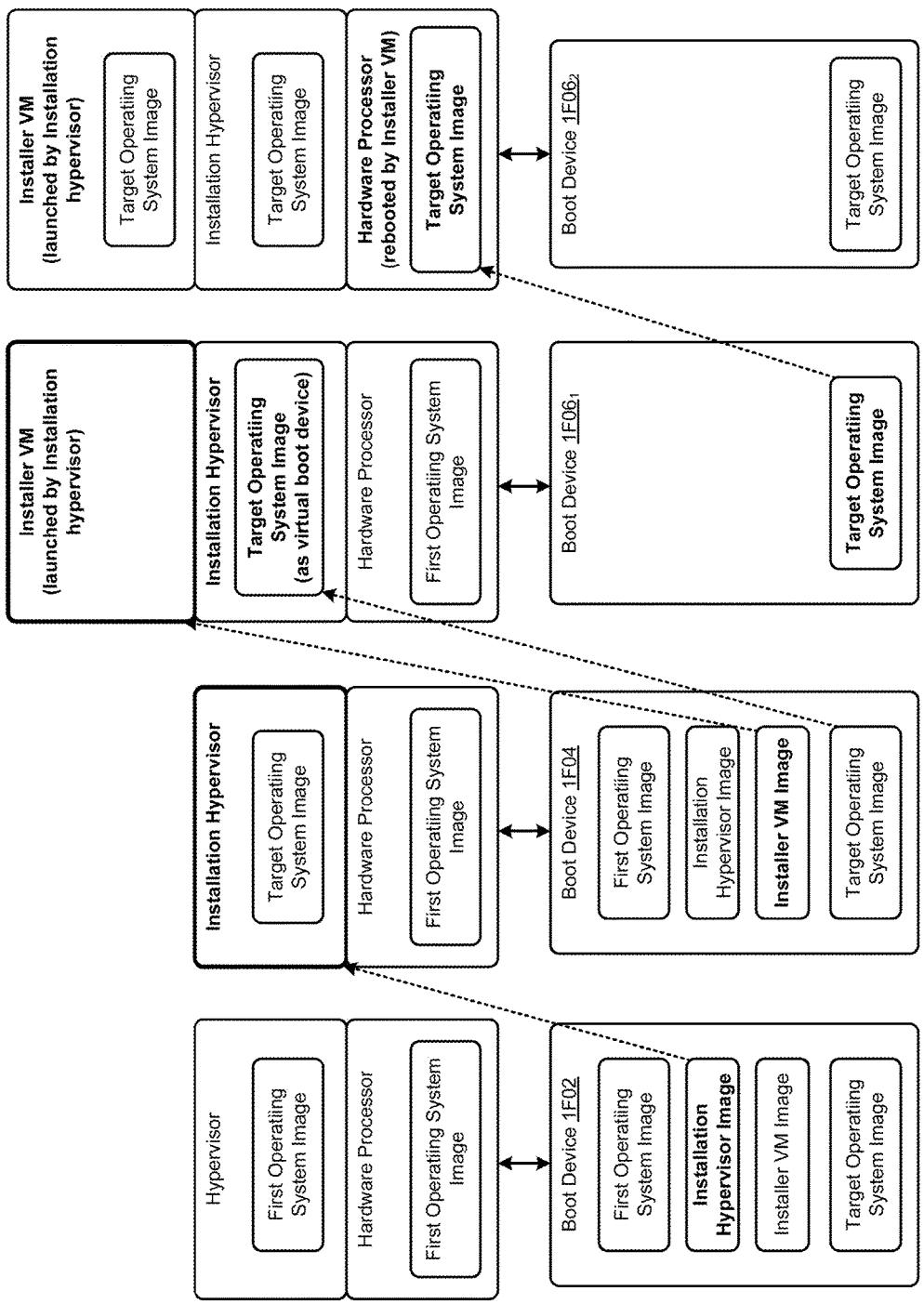

FIG. 1F depicts a progression of configurations of a system. Initially, the boot device 1F02 includes a first operating system that will be replaced by a target operating system. An installation hypervisor image is loaded along with the first operating system. The installation hypervisor then prepares a boot device 1F04 that includes an installer VM image, which is launched by the installation hypervisor. The installer VM image prepares boot device configuration $1F06_1$ that contains a target operating system image as well as other images and scripts. Upon yet another boot-up event, the image present in boot device configuration $1F06_1$ is booted into, and the system begins to execute under the target operating system. The boot device configuration $1F06_1$ may then be modified for any reason to generate a new boot device configuration $1F06_2$, for example to perform the sequence again to configure the system for boot into a third operating system.

FIG. 2A1 depicts an initial boot device configuration 2A100. The depiction FIG. 2A1 includes interrelationships between hardware components and software components.

As shown, a CPU 114 is interfaced with a memory bus 208 and a peripheral bus 210. The peripheral bus serves to interface between the CPU and a boot device 222. Referring again to FIG. 1C, a computing system (e.g., a computing system with a CPU and a BIOS) can boot-up by addressing boot media (see step 132), which boot media is stored in or on a boot device 222. In some cases, a boot device is a hard disk drive (HDD), or a solid state drive (SSD), or a CDROM, or other device that can store data for retrieval by the CPU and/or be transferred to memory.

In some situations (e.g., as pertaining to a cluster), a boot device can comprise a master boot record (MBR) as a part of or in addition to, bootable media, which in turn may comprise a bootable image. As shown, boot media—possibly including a master boot record 224 and an OS image 226—can be stored in or on a boot device such that a node or processor can access the OS image and boot up by executing instructions found within the OS image. At some point in the boot sequence, the CPU can access the content of the OS image from locations in memory. This state is represented by the shown software component labeled as operating system 206.

In exemplary installations, the configuration as depicted in FIG. 1A can serve as a starting point from which to proceed when implementing virtual machine installers. The aforementioned operating system can be any operating system, such as Windows™ or Linux™, or can be a container or can be a type 1 hypervisor (e.g., bare metal hypervisor) or type 2 hypervisor (e.g., an OS with hypervisor features). In any of these cases, one or more scripts can be included in the image, and/or one or more scripts can be stored in the boot device or any other location accessible to the CPU. The CPU can boot the operating system image and proceed to execute the scripts. As such, operations at or near the end of the OS image boot phase can include a script to repartition the boot device so as to cause the boot sequencer (e.g., BIOS) to boot a different image (see FIG. 1A2).

The initial boot device configuration 2A100 can be implemented in a stand-alone environment, such as where a single node of a cluster reimages itself. In such cases all bits (e.g., OS image, scripts, and any other data) needed for the installation is stored in locations local to the CPU (e.g., in an HDD, SSD, CDROM, RAM disk, etc.). In a cluster environment, there are many nodes present in the same chassis, so one node can control the installation of other nodes. In such a scenario, the installation bits (e.g., OS image, scripts, and any other data) needed for the installation can be transferred to a target node during a portion of the installation procedure.

As is shown and discussed below, any or all of the nodes in a cluster can be reimaged to any set of installation bits (e.g., any arbitrary operating system or any hypervisor). Such an operation to boot a different image can include booting a hypervisor installation image. An installation hypervisor boot device configuration and operations thereto are shown and discussed as pertains to FIG. 2A2.

FIG. 2A2 depicts an installation hypervisor boot device configuration 2A200 as used in systems that support virtual machine installers to boot from a volatile RAM disk boot device. As an option, one or more variations of installation hypervisor boot device configuration 2A200 or any aspect thereof may be implemented in the context of the architecture and functionality of the embodiments described herein. Also, the installation hypervisor boot device configuration 2A200 or any aspect thereof may be implemented in any environment.

In this step, the target node is prepared by adding an installer image $228_1$ to the boot device. The installer image might be a hypervisor-capable kernel image (e.g., see installation hypervisor 204). Strictly as one example, the scripts as discussed pertaining to FIG. 1A serve to place the kernel image in a separate partition (e.g., see installer image $228_1$) and activating the partition for boot (e.g., see master boot record 224).

There are alternative techniques for adding such a kernel and enabling it for boot. The specific technique can depend on the operating system currently running on the node. One approach stores the hypervisor-capable kernel image as a set of files in an existing partition and reconfigures an existing boot configuration file or script to boot the hypervisor-capable kernel image instead of the installed OS. Another approach is to replace the boot loader as may be consistent with or demanded by a particular hypervisor-capable kernel image. As shown, an installer VM 205 is situated atop installation hypervisor 204.

After such preparations are completed (e.g., the preparation of FIG. 2A1 and as heretofore discussed as pertaining to FIG. 2A2), the node is rebooted. The BIOS determines the active partition of the boot device, loads the boot loader, which in turn loads the hypervisor-capable kernel image into memory and launches it.

The hypervisor-capable kernel image (or scripts, or the boot loader) does not connect to the boot device after the hypervisor-capable kernel image is loaded into memory. Rather, the hypervisor-capable kernel image or scripts, or boot loader creates a RAM disk 214 for itself and, if needed, makes a copy of the hypervisor-capable kernel image (e.g., see installer image $228_2$). This leaves the boot device unused by the running hypervisor-capable kernel image. The boot device can be repartitioned and reformatted.

Figure 2B:
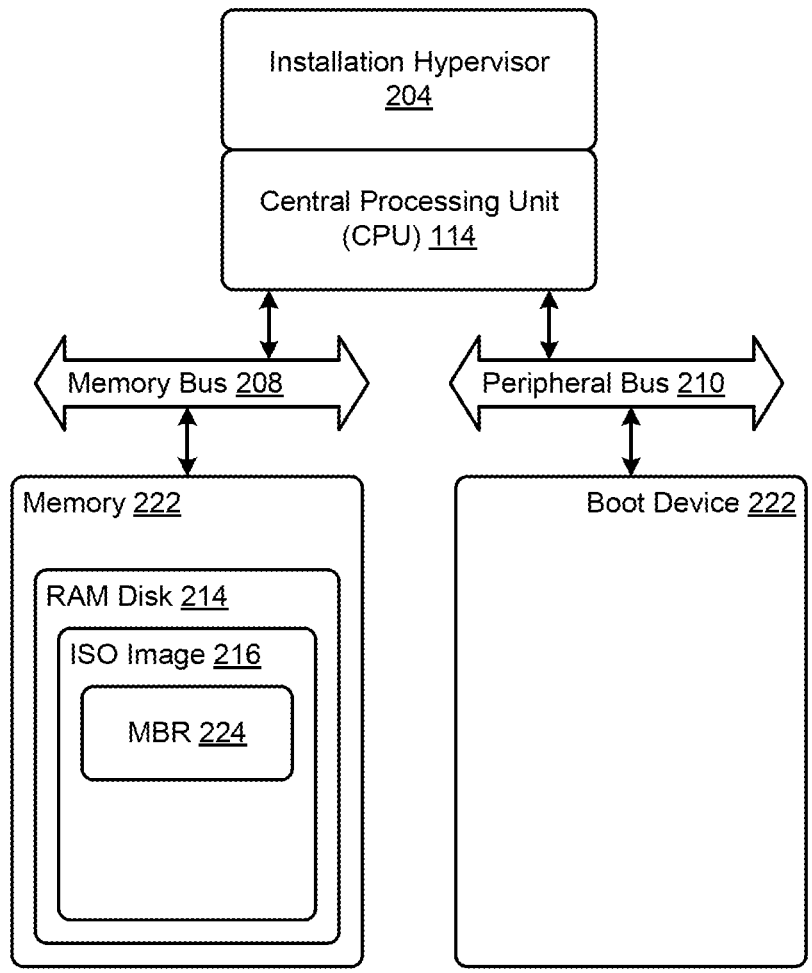
FIG. 2B depicts an installer kernel image loaded into a modified active boot device partition as used in systems that support virtual machine installers to boot from a volatile RAM disk boot device.

FIG. 2B depicts an installer kernel image loaded into a modified active boot device partition as used in systems that support virtual machine installers to boot from a volatile RAM disk boot device.

Those of ordinary skill in the art can recognize that the contents of the RAM disk can comprise contents of a bootable image in any form recognized by the BIOS. For example, and as shown, the RAM disk 214 includes an ISO image 216, which might include a master boot record (e.g., if needed by the BIOS). Such a RAM disk with an ISO image and, if needed, an MBR and other bits needed for a warm boot sequence can be loaded into the ISO image. The source of such bits can be from some other network resource such as a public web server, a cloud service, a NAS, etc. Virtually any location can serve as a source repository for such bits, at least since the installation hypervisor 204 can be configured to comprise network access capabilities.

Figure 2C:
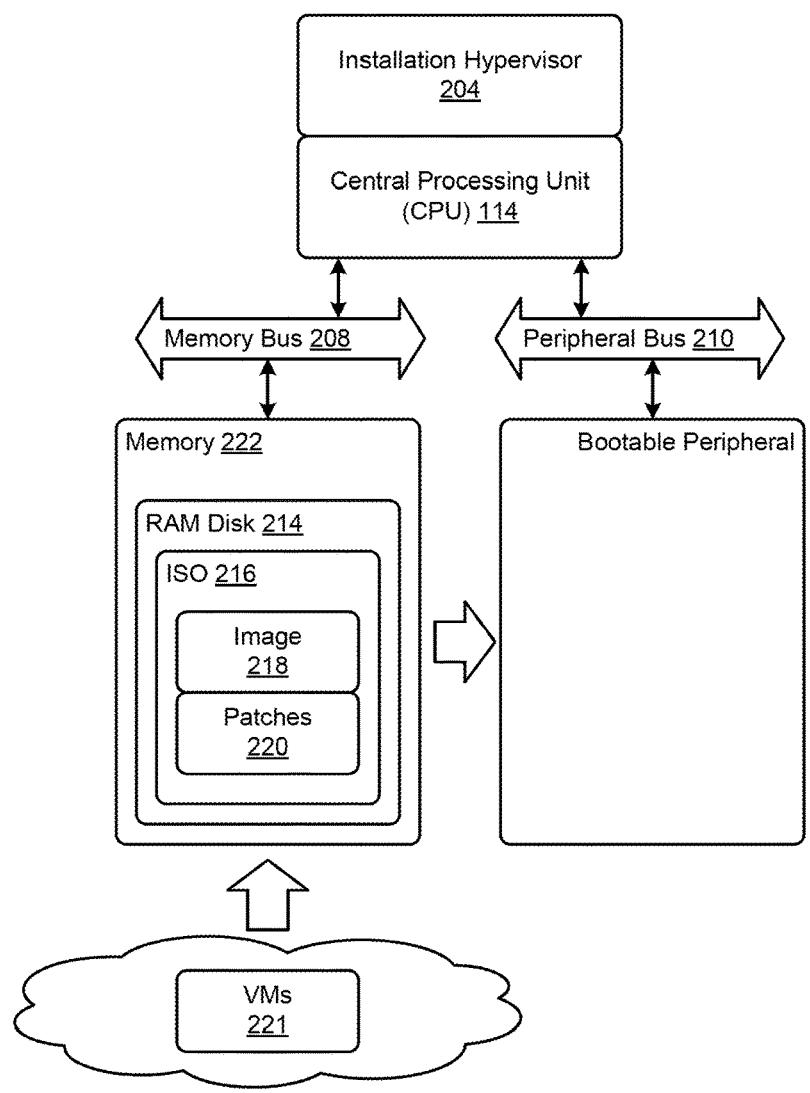
FIG. 2C depicts a target operating system image loaded into a bootable RAM disk configuration as used in systems that support virtual machine installers to boot from a volatile RAM disk boot device.

FIG. 2C depicts a target operating system image loaded into a bootable RAM disk configuration 2C00 as used in systems that support virtual machine installers to boot from a volatile RAM disk boot device. As an option, one or more variations of bootable RAM disk configuration 2C00 or any aspect thereof may be implemented in the context of the architecture and functionality of the embodiments described herein. Also, the bootable RAM disk configuration 2C00 or any aspect thereof may be implemented in any environment.

After creating the RAM disk, the installation hypervisor 204 loads installation media (e.g., see image 218) and any other possibly required bits (e.g., patches 220) into the RAM disk. In some cases enabling an image for boot-readiness might require one or more patches, and/or other bits (e.g., a "kickstart" file) and/or scripts, and/or any sets of VMs 221 or other sets of instructions to be loaded into the installation media. Retrieval and assembly of the complete set of bits needed for a bootable configuration can be done at any time. In some cases, the retrieval and assembly is performed during node installation (e.g., by the installation hypervisor). In another situation, the bootable configuration can be assembled in an earlier timeframe such that the node installation performs unpacking the ISO on RAM disk, applying the patches 220 to the image 218, and repackaging it.

At this point, the node is running the installation hypervisor 204, and the RAM disk comprises a (possibly) patched image (e.g., a target operating system in bootable form) and any scripts and/or instances of VMs 221 in a packaged image. A copy of this patched and packaged image can be stored on any selected bootable peripheral. If needed, an MBR is written to the selected bootable peripheral to form the bootable configuration of FIG. 2D.

Figure 2D:
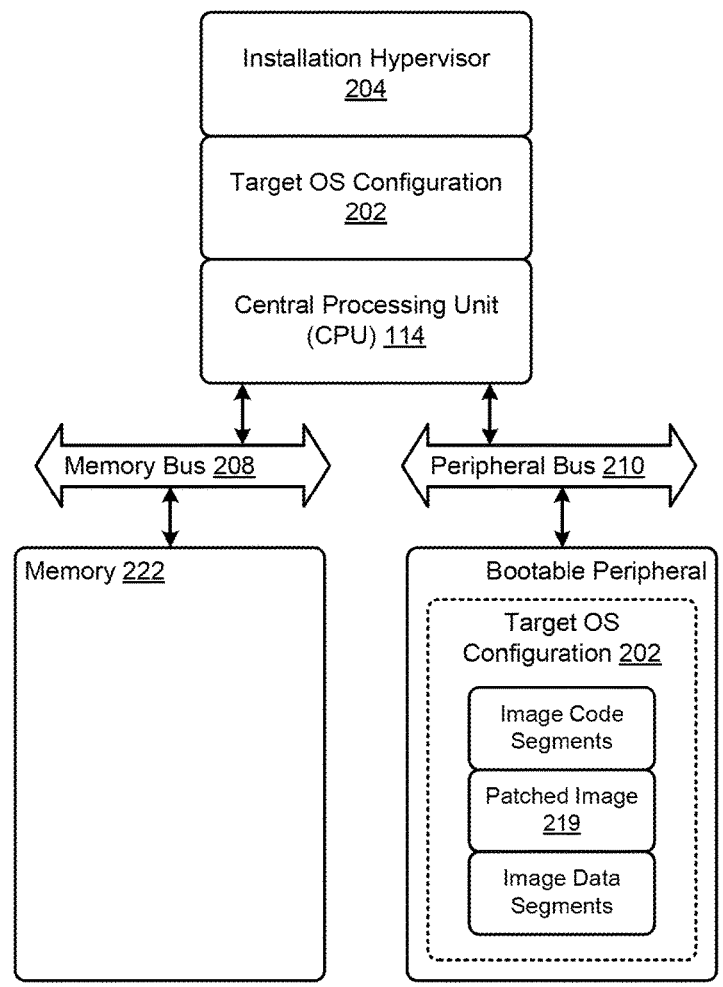
FIG. 2D depicts a target operating system image loaded into a reformatted boot device as used in systems that support virtual machine installers to boot from a volatile RAM disk boot device.

FIG. 2D depicts a target operating system image loaded into a reformatted boot device 2D00 as used in systems that support virtual machine installers to boot from a volatile RAM disk boot device. As an option, one or more variations of reformatted boot device 2D00 or any aspect thereof may be implemented in the context of the architecture and functionality of the embodiments described herein. Also, the reformatted boot device 2D00 or any aspect thereof may be implemented in any environment.

The installation hypervisor 204 (or, more specifically, an installation script running on the installation hypervisor) creates a patched image 219 that can comprise a target OS configuration 202 in bootable form, plus any code, data, scripts and/or other contents in a packaged image. The installation hypervisor 204 can store the packaged image onto a peripheral that can serve as a boot device (possibly with reformatting as is applicable to the selected bootable peripheral).

The installation hypervisor 204 can boot itself. If the selected bootable peripheral comprises non-volatile storage, the boot can be a cold boot (or a warm boot). Alternatively, the installation hypervisor 204 can accept instructions from an orchestrator. More specifically, and as aforementioned, in a cluster environment, where there are many nodes present in the same chassis, one node (e.g., an installation orchestrator node) can control the installation of other nodes. In such an installation scenario, the installation bits (e.g., OS image, scripts, and any other data or commands) needed for the installation can be transferred to a target node during a portion of the installation procedure. The following FIG. 3 pertains to one such installation scenario.

Figure 3:
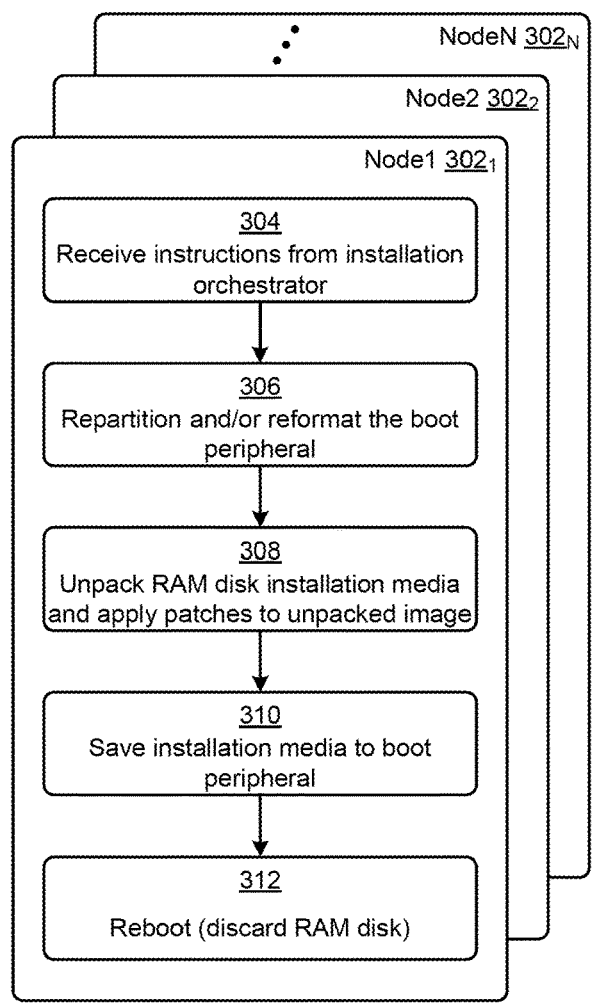
FIG. 3 depicts processing flows and iterations to implement cluster-wide node boot-up operations in clusters that support virtual machine installers to boot from a volatile RAM disk boot device.

FIG. 3 depicts processing flows and iterations to implement cluster-wide node boot-up operations 300 in clusters that support virtual machine installers to boot from a volatile RAM disk boot device. As an option, one or more variations of cluster-wide node boot-up operations 300 or any aspect thereof may be implemented in the context of the architecture and functionality of the embodiments described herein.

Also, the cluster-wide node boot-up operations 300 or any aspect thereof may be implemented in any environment.

The embodiment shown in FIG. 3 is merely one example. In this installation scenario scripts running on the installation orchestrator node can perform administrative functions and/or can make modifications to the system. Strictly as examples, one or more nodes (e.g., see node1 $302_1$, node2 $302_2$, nodeN $302_N$) can receive instructions from a cluster manager or an installation orchestrator (see step 304) and any node can coordinate with any other one or more nodes so as to perform or direct acts corresponding to:

- Repartitioning and formatting other media in the system (see step 306).
- Installing additional payload, such as further VMs and/or application software (see step 308). This step can include custom steps such as injecting a "firstboot" script into the target OS configuration such that a node with such a "firstboot" script configured into the target OS configuration will run the script on its first boot.
- Save installation media to boot peripheral (see step 310).
- Reboot (see step 312), which can include discarding the contents of the RAM disk upon boot into the target OS and hypervisor configuration.

Any or all of the aforementioned steps leading to booting into the target OS and hypervisor configuration can be performed under machine control, with near zero setup or interaction by a system administrator. The following state diagrams (see FIG. 4A through FIG. 4C) depict a sequence of operational states and transitions that can be carried out automatically by a machine.

Figure 4A:
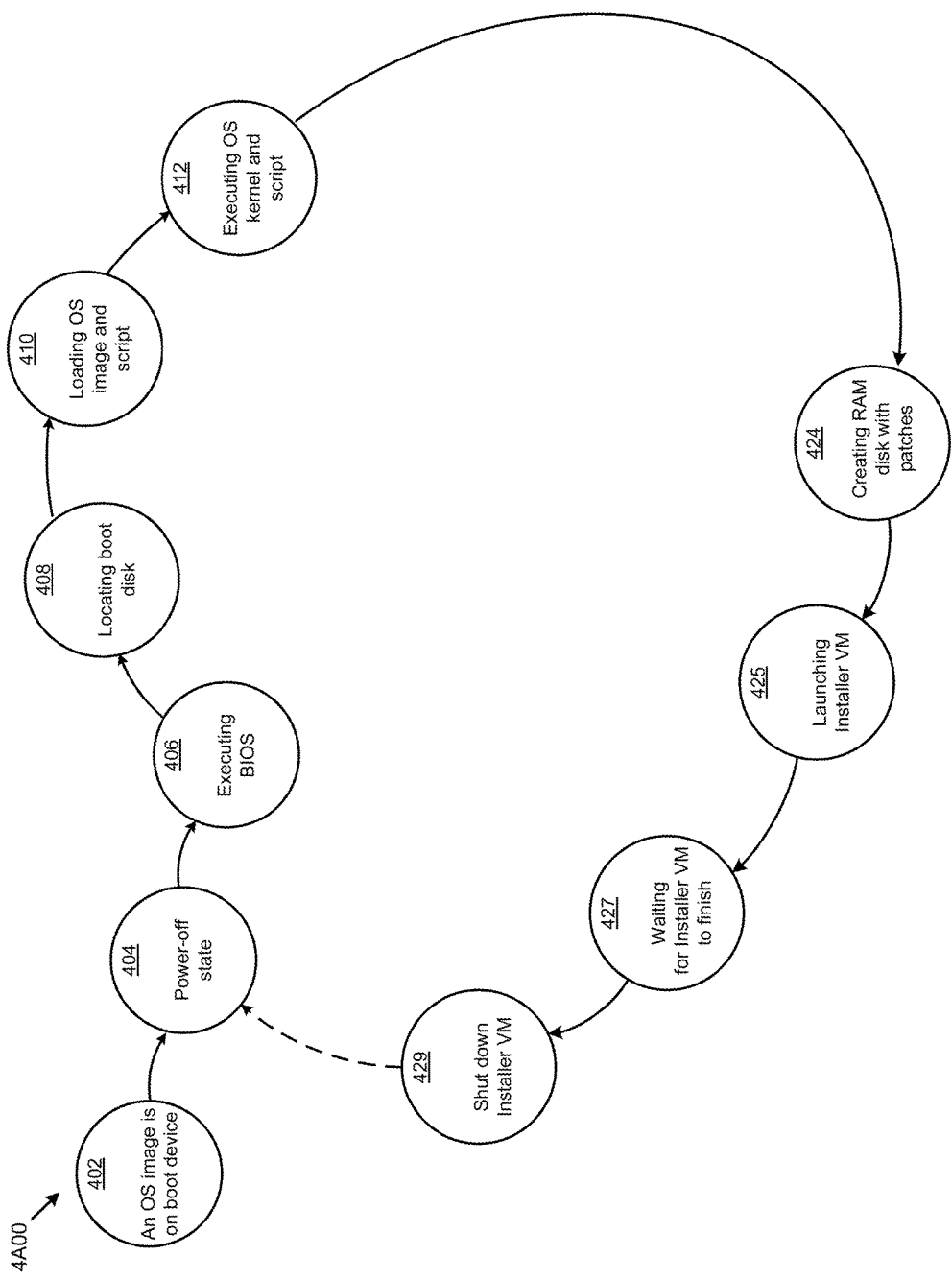
FIG. 4A is a state diagram showing installer VM bring-up transitions as used in systems that support virtual machine installers to boot from a volatile RAM disk boot device.

FIG. 4A is a state diagram showing installer VM bring-up transitions 4A00 as used in systems that support virtual machine installers to boot from a volatile RAM disk boot device. As an option, one or more variations of installer VM bring-up transitions 4A00 or any aspect thereof may be implemented in the context of the architecture and functionality of the embodiments described herein. Also, the installer VM bring-up transitions 4A00 or any aspect thereof may be implemented in any environment.

The shown state 402 depicts an initial state where a node is operational under some arbitrary (possibly unknown) operating system. The hardware of the system can be powered-on or can be powered-off, such as is shown in state 404. Upon a power-up event, the system will execute the BIOS (see state 406), which in turn will locate a boot device and possibly a master boot record (see state 408). When there is a boot disk with an MBR, then the BIOS will initiate loading the OS found there, along with any scripts or other bits that are configured into the boot device (see state 410). When loading is OK, the CPU begins to execute the OS along with any found scripts (see state 412). In some cases, a process or script (as shown), initiates activities to put a hypervisor-capable kernel onto a RAM disk that has a boot partition (see state 424). Processing continues for launching an installer VM, which may take some elapsed time to finish its processing. The system is in a state of waiting for the installer VM to finish (see state 427). When the installer VM has completed its assigned tasks, the installer VM can self-terminate, or can be shut down (see state 429). At some point, forward processing initiates a boot cycle, which event causes the CPU to transfer control to the BIOS (again, see state 406).

Figure 4B:
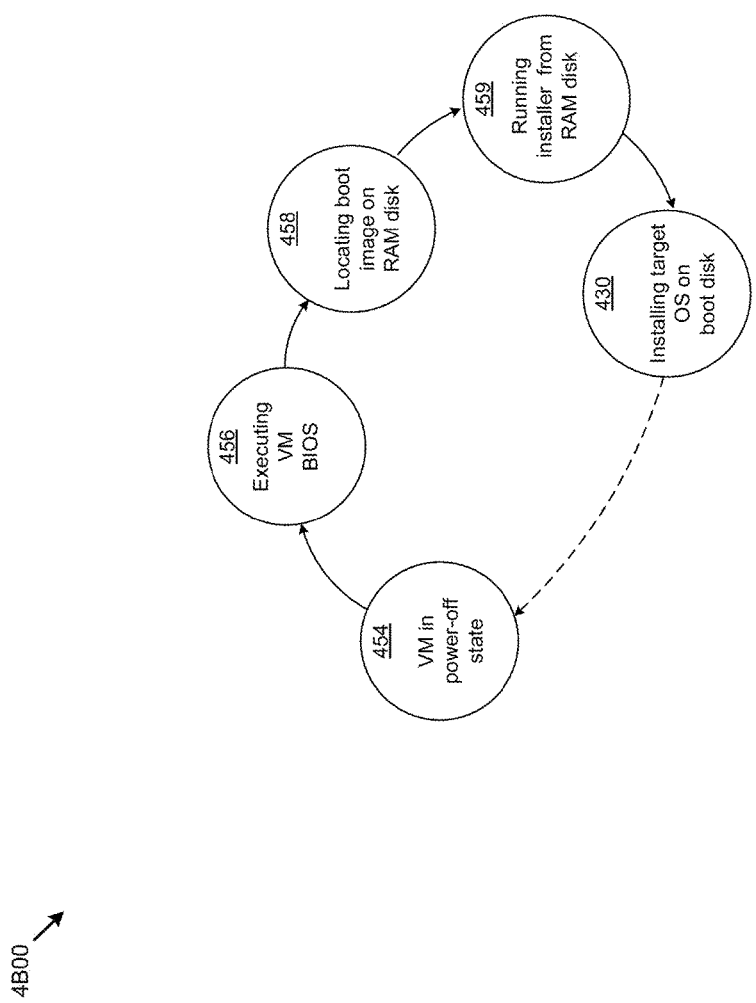
FIG. 4B is a state diagram showing a RAM disk boot sequence for bring-up of an installation VM as used in systems that support virtual machine installers to boot from a volatile RAM disk boot device.

FIG. 4B is a state diagram showing a RAM disk boot sequence 4B00 for bring-up of an installation VM as used in systems that support virtual machine installers to boot from a volatile RAM disk boot device. As an option, one or more variations of RAM disk boot sequence 4B00 or any aspect thereof may be implemented in the context of the architecture and functionality of the embodiments described herein. Also, the RAM disk boot sequence 4B00 or any aspect thereof may be implemented in any environment.

Based on a transition from the foregoing FIG. 4A, or by any other transition (e.g., from state 454), the machine begins to execute the VM BIOS (see state 456), and the VM BIOS will locate a MBR on the RAM disk (see state 458). Based on the operations performed in the state transitions described as pertains to FIG. 4B, the RAM disk boot volume comprises the installer that was loaded onto the RAM disk boot partition. This installer is run (see state 459) and, either by its own set of instructions and/or by a script, the installer serves to install a target OS onto a bootable device (see state 430). This installer retrieves any additional loads and applies any patches as may be needed to configure the target OS.

Figure 4C:
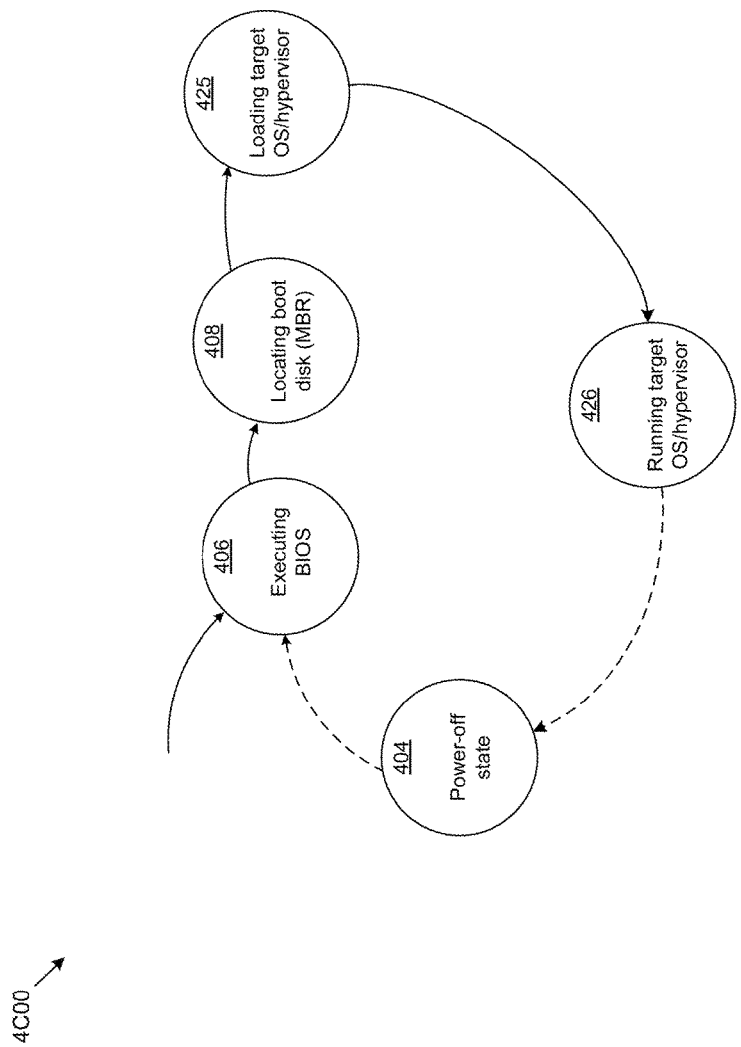
FIG. 4C is a state diagram showing a target OS bring-up sequence as used in systems that support virtual machine installers to boot from a volatile RAM disk boot device.

FIG. 4C is a state diagram showing a target OS bring-up sequence 4C00 as used in systems that support virtual machine installers to boot from a volatile RAM disk boot device. As an option, one or more variations of target OS bring-up sequence 4C00 or any aspect thereof may be implemented in the context of the architecture and functionality of the embodiments described herein. Also, the target OS bring-up sequence 4C00 or any aspect thereof may be implemented in any environment.

As shown, the machine begins to execute the BIOS (see state 406), and the BIOS will locate a boot device (see state 408). Such a boot device might be identifiable by and/or comprise an ISO image and/or s such a boot device might be identifiable by presence of a partition table (e.g., a GUID partition table (GPT)) that indicates bootable content on a partition. Based on these or other operations performed in this or previous state transitions a boot device will be detected by the BIOS, however this time around, the OS image and script that is loaded (see state 410) is the target OS and hypervisor that was loaded onto the boot partition during the transitions of the foregoing FIG. 4A and FIG. 4B. This target OS and hypervisor is loaded (see state 425) and, either through native instructions or through a script, serves to launch a target hypervisor such that the target OS and hypervisor are running (see state 426). It is possible that the machine might enter a power-off state (see state 404). In such a case the BIOS would recognize the boot device that was prepared in state 430. Indeed, as shown, the BIOS is entered from a power-off state (see state 404) the boot device comprising the target OS and hypervisor will be recognized by the BIOS as the boot volume.

Additional Embodiments of the Disclosure

Additional Practical Application Examples

Figure 5:
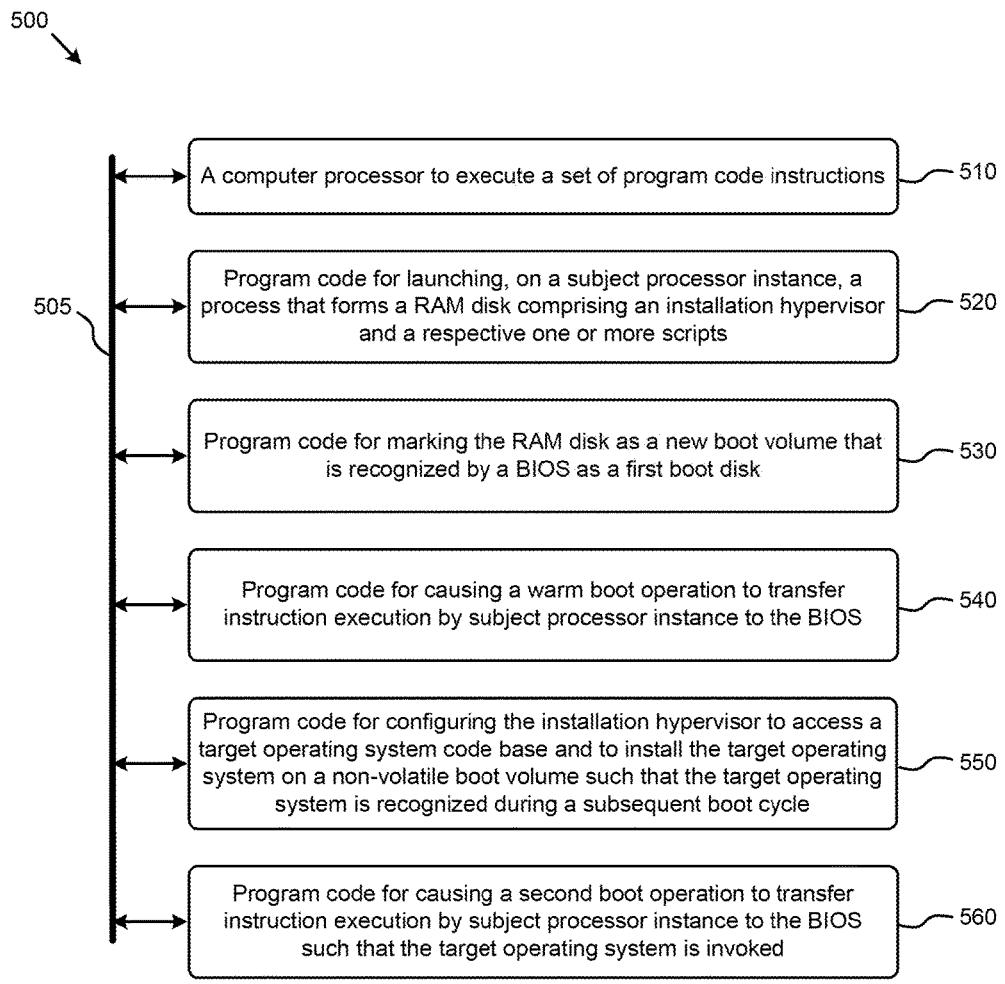
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment.

The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The shown embodiment implements a portion of a computer system, presented as system 500, comprising a computer processor to execute a set of program code instructions (see module 510) and modules for accessing memory to hold program code instructions to perform: launching, on a subject processor instance, a process that forms a RAM disk comprising an installation hypervisor and a respective one or more scripts (see module 520); marking the RAM disk as a new boot volume that is recognized by a BIOS as a first boot disk (see module 530); causing a warm boot operation to transfer instruction execution by subject processor instance to the BIOS (see module 540); configuring the installation hypervisor to access a target operating system code base and to install the target operating system on a non-volatile boot volume such that the target operating system is recognized during a subsequent boot cycle (see module 550); and causing a second boot operation to transfer instruction execution by subject processor instance to its BIOS such that the target operating system is invoked (see module 560).

System Architecture Overview

Additional System Architecture Examples

Figure 6A:
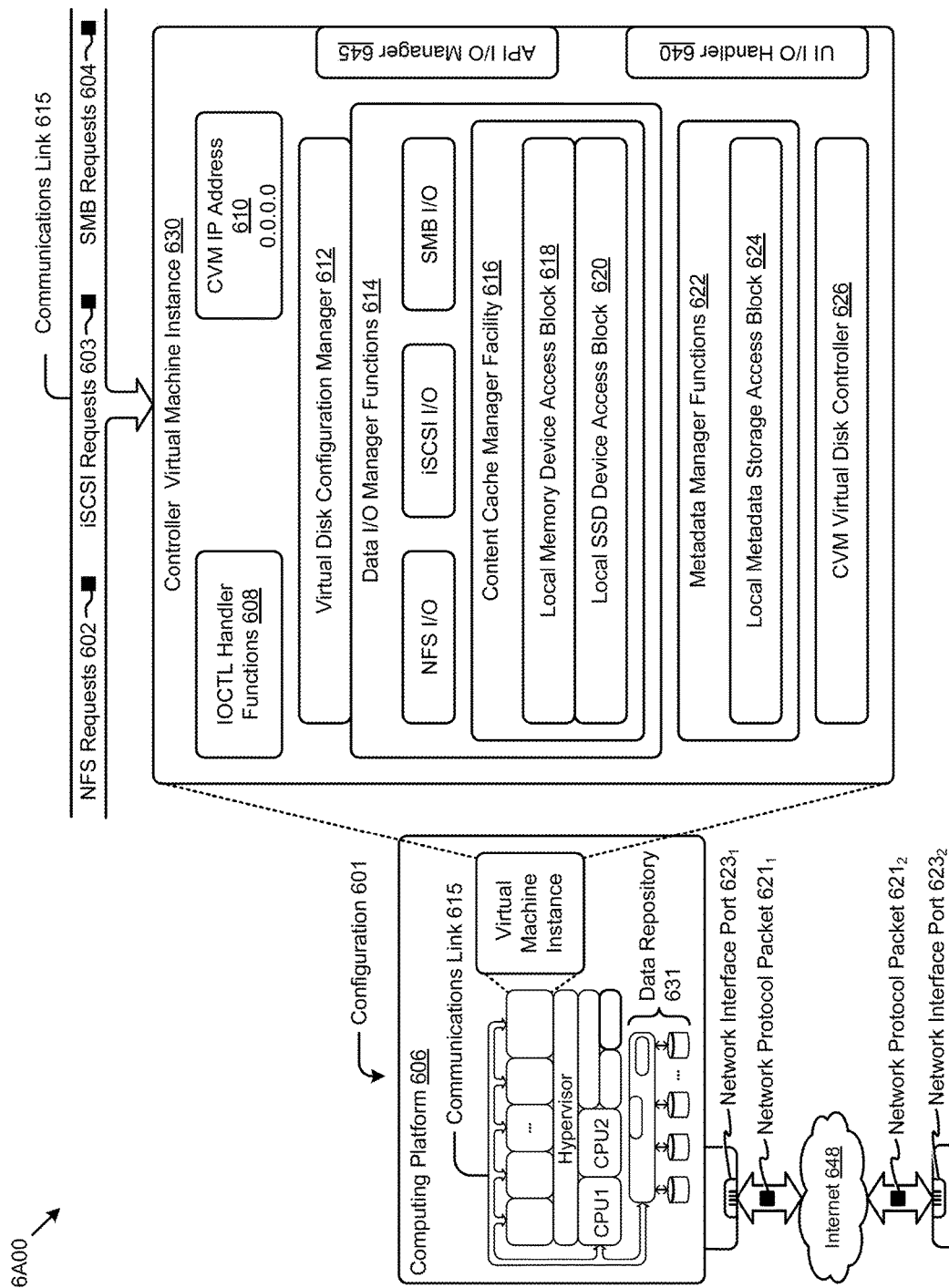
FIG. 6A and FIG. 6B depict architectures comprising collections of interconnected components suitable for implementing embodiments of the present disclosure and/or for use in the herein-described environments.

FIG. 6A depicts a virtual machine architecture 6A00 comprising a collection of interconnected components suitable for implementing embodiments of the present disclosure and/or for use in the herein-described environments. The shown virtual machine architecture 6A00 includes a virtual machine instance in a configuration 601 that is further described as pertaining to the controller virtual machine instance 630. A controller virtual machine instance receives block I/O (input/output or IO) storage requests as of network file system (NFS) requests in the form of NFS requests 602, and/or internet small computer storage interface (iSCSI) block IO requests in the form of iSCSI requests 603, and/or Samba file system requests (SMB) in the form of SMB requests 604. The controller virtual machine instance publishes and responds to an internet protocol (IP) address (e.g., see CVM IP address 610. Various forms of input and output (TO) can be handled by one or more IO control handler IOCTL handler functions 608 that interface to other functions such as data IO manager functions 614, metadata manager functions 622. As shown, the data IO manager functions can include communication with a virtual disk configuration manager 612, and/or can include direct or indirect communication with any of various block IO functions (e.g., NFS IO, iSCSI IO, SMB IO, etc.).

In addition to block IO functions, the configuration 601 supports IO of any form (e.g., block IO, streaming IO, packet-based IO, HTTP traffic, etc.) through either or both of a user interface (UI) handler such as UI IO handler 640 and/or through any of a range of application programming interfaces (APIs), possibly through the shown API IO manager 645.

The communications link 615 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packetization (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid state storage devices (SSD), or optical or magnetic disks such as disk drives or tape drives. Volatile media includes dynamic memory such as a random access memory. As shown, the controller virtual machine instance 630 includes a content cache manager facility 616 that accesses storage locations, possibly including local DRAM (e.g., through the local memory device access block 618) and/or possibly including accesses to local solid state storage (e.g., through local SSD device access block 620).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 631, which in turn can be formatted into any one or more storage areas, and which can comprise parameterized storage accessible by a key (e.g., a filename, a table name, a block address, an offset address, etc.). An external data repository 631, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 624. The external data repository 631, can be configured using a CVM virtual disk controller 626, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 601 can be coupled by a communications link 615 (e.g., backplane, LAN, PTSN, wired or wireless network, etc.) and each instance may perform respective portions of sequences of instructions as may be required to practice embodiments of the disclosure The shown computing platform 606 is interconnected to the Internet 648 through one or more network interface ports (e.g., network interface port $623_1$ and network interface port $623_2$). The configuration 601 can be addressed through one or more network interface ports using an IP address. Any operational element within computing platform 606 can perform sending and receiving operations using any of a range of network protocols, possibly including network protocols that send and receive packets (e.g., see network protocol packet $621_1$ and network protocol packet $621_2$).

The computing platform 606 may transmit and receive messages that can be composed of configuration data, and/or any other forms of data and/or instructions organized into a data structure (e.g., communications packets). In some cases, the data structure includes program code instructions (e.g., application code), communicated through Internet 648 and/or through any one or more instances of communications link 615. Received program code may be processed and/or executed by a CPU as it is received and/or program code may be stored in any volatile or non-volatile storage for later execution. Program code can be transmitted via an upload (e.g., an upload from an access device over the Internet 648 to computing platform 606). Further, program code and/or results of executing program code can be delivered to a particular user via a download (e.g., a download from the computing platform 606 over the Internet 648 to an access device).

The configuration 601 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics pertaining to virtual machine installers.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of virtual machine installers). Such files or records can be brought into and/or stored in volatile or non-volatile memory.

Figure 6B:
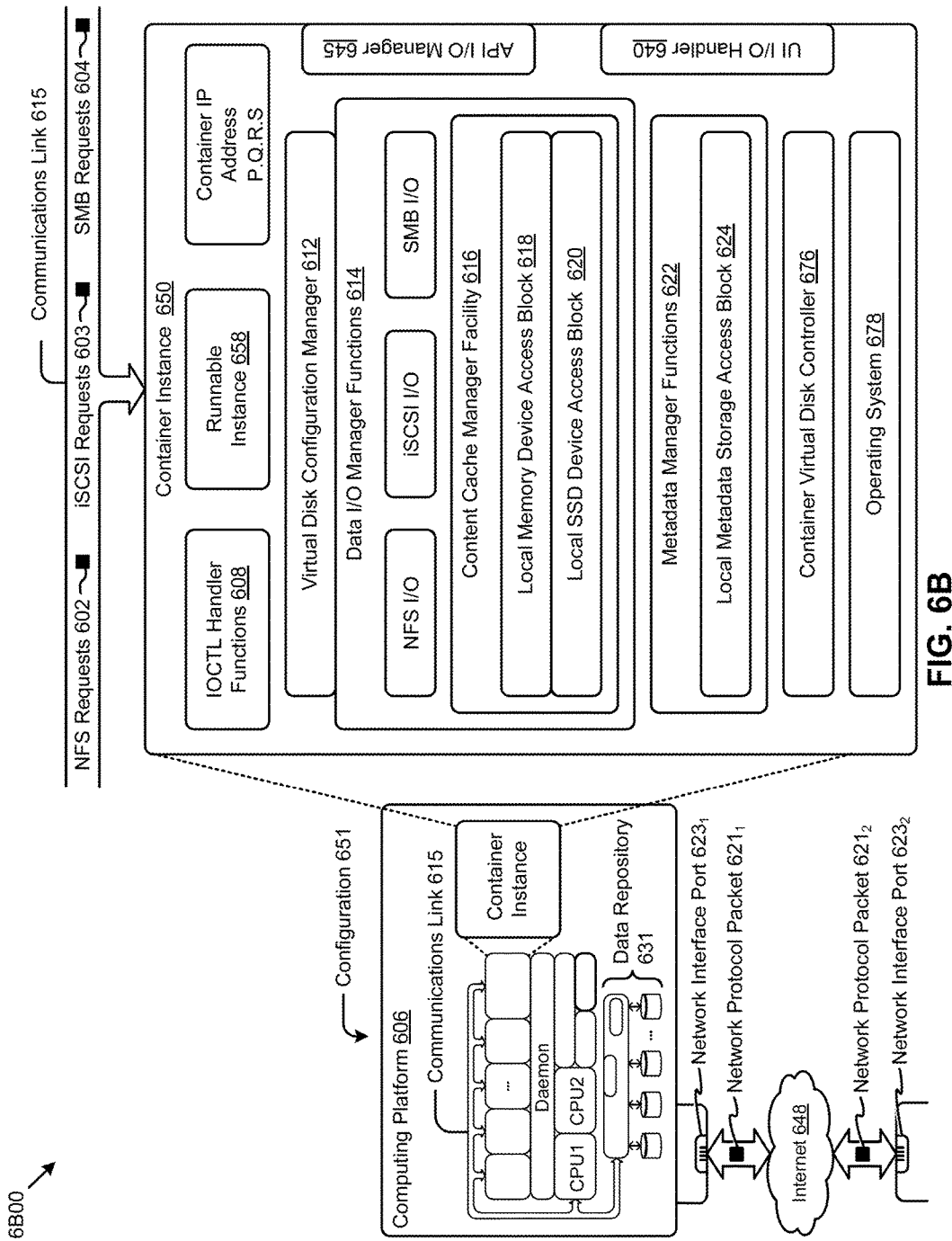

FIG. 6B depicts a containerized architecture 6B00 comprising a collection of interconnected components suitable for implementing embodiments of the present disclosure and/or for use in the herein-described environments. The shown containerized architecture 6B00 includes a container instance in a configuration 651 that is further described as pertaining to the container instance 650. The configuration 651 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system 678, however such an operating system need not be provided. Instead, a container can include a runnable instance 658, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 676. Such a container virtual disk controller can perform any of the functions that the aforementioned CVM virtual disk controller 626, yet such a container virtual disk controller does not rely on a hypervisor or any particular operating system in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:
1. A method comprising:
launching, on a subject processor instance that is running a first operating system, an installation hypervisor that forms a RAM disk comprising a target operating system boot image and respective one or more scripts, the installation hypervisor preparing the RAM disk as a first boot device comprising at least an installation hypervisor image, a target operating system boot image and installer virtual machine image;
launching, by the installation hypervisor, an installer virtual machine that prepares a second boot device comprising the target operating system boot image, wherein the installation hypervisor runs a target operating system from the first boot device as a virtual boot device;
exposing at least a portion of the RAM disk to the installer virtual machine as the virtual boot device that comprises the target operating system boot image;
exposing a boot device to the installer virtual machine to cause the installer virtual machine to boot;
booting, on the subject processor instance, the installer virtual machine from the target operating system boot image; and
executing the target operating system on the subject processor instance through initiating a boot operation to cause transfer of instruction execution, by the subject processor instance, to a BIOS entry point of the subject processor instance, such that the target operating system image is booted on the subject processor instance by the installer virtual machine, wherein the target operating system booted from the second boot device is different from the first operating system.

2. The method of claim 1, further comprising writing, to the RAM disk, at least one of, an ISO file, or a master boot record.

3. The method of claim 1, further comprising reformatting a prior boot volume after marking the RAM disk as a new boot volume.

4. The method of claim 1, wherein a configuration of the installation hypervisor further comprises retrieving a patch that pertains to loading or operation of the installation hypervisor.

5. The method of claim 1, further comprising retrieving a patch that pertains to loading or operation of a target operating system.

6. The method of claim 5, wherein the patch that pertains to the operation of the target operating system is retrieved using an internet protocol.

7. The method of claim 1, further comprising receiving, by the installation hypervisor, a set of installation instructions to unpack media store on the RAM disk.

8. The method of claim 1, further comprising receiving, by the installation hypervisor, a set of installation instructions to transfer at least a portion of media on the RAM disk to a new boot volume.

9. The method of claim 1, further comprising booting from a new boot volume after a power-off event.

10. The method of claim 1, further comprising configuring an installation orchestrator node.

11. A computer program product embodied on a non-transitory computer readable medium, the non-transitory computer readable medium having stored thereon a sequence of instructions which, when executed by a processor causes the processor to perform a set of acts, the acts comprising:
    launching, on a subject processor instance that is running a first operating system, an installation hypervisor that forms a RAM disk comprising a target operating system boot image and respective one or more scripts, the installation hypervisor preparing the RAM disk as a first boot device comprising at least an installation hypervisor image, a target operating system boot image and installer virtual machine image;
    launching, by the installation hypervisor, an installer virtual machine that prepares a second boot device comprising the target operating system boot image, wherein the installation hypervisor runs a target operating system from the first boot device as a virtual boot device;
    exposing at least a portion of the RAM disk to the installer virtual machine as the virtual boot device that comprises the target operating system boot image;
    exposing a boot device to the installer virtual machine to cause the installer virtual machine to boot;
    booting, on the subject processor instance, the installer virtual machine from the target operating system boot image; and
    executing the target operating system on the subject processor instance through initiating a boot operation to cause transfer of instruction execution, by the subject processor instance, to a BIOS entry point of the subject processor instance, such that the target operating system image is booted on the subject processor instance by the installer virtual machine, wherein the target operating system booted from the second boot device is different from the first operating system.

12. The computer program product of claim 11, further comprising instructions which, when stored in memory and executed by the processor causes the processor to perform acts of writing, to the RAM disk, at least one of, an ISO file, or a master boot record.

13. The computer program product of claim 11, further comprising instructions which, when stored in memory and executed by the processor causes the processor to perform acts of reformatting a prior boot volume after marking the RAM disk as a new boot volume.

14. The computer program product of claim 11, wherein a configuration of the installation hypervisor further comprises instructions which, when stored in memory and executed by the processor causes the processor to perform acts of retrieving a patch that pertains to loading or operation of the installation hypervisor.

15. The computer program product of claim 11, further comprising instructions which, when stored in memory and executed by the processor causes the processor to perform acts of retrieving a patch that pertains to loading or operation of a target operating system.

16. The computer program product of claim 15, wherein the patch that pertains to the operation of the target operating system is retrieved using an internet protocol.

17. The computer program product of claim 11, further comprising instructions which, when stored in memory and executed by the processor causes the processor to perform acts of receiving, by the installation hypervisor, a set of installation instructions to unpack media store on the RAM disk.

18. The computer program product of claim 11, further comprising instructions which, when stored in memory and executed by the processor causes the processor to perform acts of configuring an installation orchestrator node.

19. A system comprising:
    a storage medium having stored thereon a sequence of instructions; and
    a processor or processors that execute the instructions to cause the processor or processors to perform a set of acts, the acts comprising,
        launching, on a subject processor instance that is running a first operating system, an installation hypervisor that forms a RAM disk comprising a target operating system boot image and respective one or more scripts, the installation hypervisor preparing the RAM disk as a first boot device comprising at least an installation hypervisor image, a target operating system boot image and installer virtual machine image;
        launching, by the installation hypervisor, an installer virtual machine that prepares a second boot device comprising the target operating system boot image, wherein the installation hypervisor runs a target operating system from the first boot device as a virtual boot device;
        exposing at least a portion of the RAM disk to the installer virtual machine as the virtual boot device that comprises the target operating system boot image;
        exposing a boot device to the installer virtual machine to cause the installer virtual machine to boot;
        booting, on the subject processor instance, the installer virtual machine from the target operating system boot image; and
        executing the target operating system on the subject processor instance through initiating a boot operation to cause transfer of instruction execution, by the subject processor instance, to a BIOS entry point of the subject processor instance, such that the target operating system image is booted on the subject processor instance by the installer virtual machine, wherein the target operating system booted from the second boot device is different from the first operating system.

20. The system of claim 19 wherein a configuration of the installation hypervisor further comprises instructions which, when stored in memory and executed by the processor causes the processor to perform acts of retrieving a patch that pertains to loading or operation of the installation hypervisor.

* * * * *